United States Patent Office 3,534,005
Patented Oct. 13, 1970

3,534,005
ARENESULFENYL HALIDE-MODIFIED ELASTOMERIC POLYMERS
Walter Nudenberg, West Caldwell, and Douglas I. Relyea, Pompton Plains, N.J., assignors to Uniroyal, Inc., New York, N.Y., a corporation of New Jersey
No Drawing. Filed Sept. 29, 1967, Ser. No. 671,584
Int. Cl. C08g 33/00
U.S. Cl. 260—79     9 Claims

ABSTRACT OF THE DISCLOSURE

The present invention relates to the product formed by the reaction of an unsaturated elastomeric polymer such as cis-polybutadiene with an arenesulfenyl halide of the formula (aryl)—S—X wherein (aryl) is an unsubstituted phenyl group, or a phenyl group substituted with at least one radical selected from the group consisting of alkyl groups having 1 to 8 carbon atoms, nitro, halo or carboxyl groups, and X is bromine, chlorine or fluorine to obtain an oil-resistant elastomeric polymer, and the process for making same.

---

An article entitled "New Methods for the Modification of Unsaturated Polymers" by H. Holtschmidt et al., Makromol. Chem., 101, 271 (1967) describes (1) the preparation of 4-isocyanatobenzenesulfenyl chloride, (2) the addition of said compound to cis-polybutadiene, and (3) the reaction of the chemically modified rubber with diols or diamines. The method described in said article provides for utilization of the functionally-substituted sulfenyl chloride to form an adduct which is reactive towards diols, diamines or related compounds and is apparently used only as a step in the crosslinking of unsaturated polymers to increase the molecular weight thereof. When the isocyanatobenzenesulfenyl chloride reacts with the bis-polybutadiene as disclosed in said article a product is formed which is water-sensitive and therefore has limited storage sability under ordinary conditions of temperature and humidity. The limited storage stability is due to the tendency of water (from the atmosphere) to react with the pendant isocyanato groups to form ureylene crosslinks.

By way of contrast, the product of the present invention is a non-crosslinked (linear), water-insensitive, thermally stable elastomeric polymer which, because of its improved resisance to swelling by hydrocarbon solvents (compared with unmodified elastomeric polymers) can be used in the manufacture of hoses, hose gaskets, spark plug covers, rotating shaft seals, or articles which in use are exposed to fluorocarbons, such as hoses and seals for air-conditioning units.

The polymeric adducts of sulfenyl halides of the present invention have an advantage over the corresponding adducts of mercaptans in that the double bond in the adducts of the present invention can be regenerated by elimination of hydrogen halide whereas the double bond of the mercaptan adduct cannot be regenerated. The new adducts of the present invention also show unexpectedly rapid cure rates.

In accordance with the present invention unsaturated elastomeric polymers are reacted with arenesulfenyl halides to produce partially or completely saturated, non-crosslinked polymeric products. The reaction is illustrated by the following equation for the case of polybutadiene:

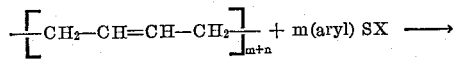 + m(aryl) SX ⟶

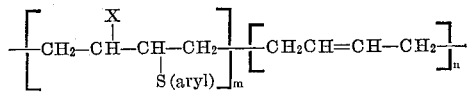

where (aryl) is an aryl group as defined hereinafter, X is halogen, m and n are integers, in which polymer the repeat units are randomly distributed throughout the polymer. Thus $$\frac{m}{m+n}$$

defines the degree of saturation of the product, relative to that of a fully saturated product ($n=0$) taken as unity.

An example of a preferred elastomeric polymer which can be used in the present invention is cis-polybutadiene, however, other unsaturated rubbery polymers such as trans-polybutadiene, ethylene-propylene-dicyclopentadiene terpolymer, acrylonitrile-butadiene copolymer and styrene-butadiene rubber may be used.

The sulfenyl halides used in the present invention are preferably arenesulfenyl halides which are characterized by the general formula (aryl)—S—X, wherein (aryl) is an unsubstituted aryl group, or an aryl group which is substituted with lower alkyl (between 1 and 8 carbon atoms) nitro, halogen or carboxyl groups or combinations thereof, and X is a halogen such as chlorine bromine or fluorine. Examples of such aryl grous are phenyl, naphthyl, pentamethyl phenyl, 2,4,6-trimethylphenyl, tert-butylphenyl, ethylpenyl, o-tolyl, m-tolyl, p-tolyl, p-bromopehnyl, p-chlorophenyl, p-fluorophenyl, o-nitrophenyl, p-nitrophenyl, 2,4-dinitrophenyl, per(penta)chlorophenyl, perfluorophenyl, 4-chloro-meta tolyl, and o-carboxyphenyl.

The present invention is surprisingly unobvious because when a substituted or un-substituted alkane sulfenyl halide such as tert-butyl sulfenyl chloride, trichloromethane sulfenyl chloride, or trifluoromethane sulfenyl chloride is employed as a reactant in the present invention, the resulting polymer is not as resistant to swelling by hydrocarbon solvents as is a product of the present invention.

When a cis- or trans-polybutadiene is reacted with an arenesulfenyl halide and 100% addition is achieved, the product obtained is a polymer containing units therein having molecules with alternating asymmetric carbon atoms in the backbone chain. Since each repeat unit has two asymmetric carbon atoms a threo-diisotactic polymer is formed from cis-polybutadiene and can be exemplified using the following Newman projection:

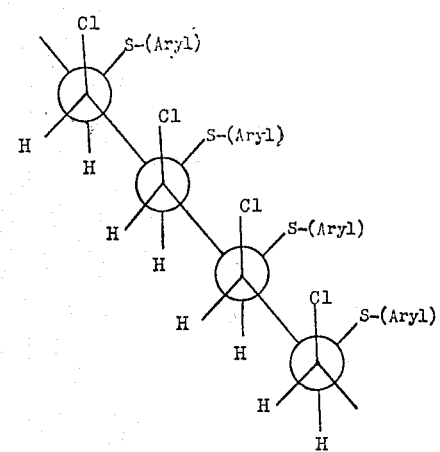

(In the Newman projection, the bond joining adjacent carbon atoms in the main chain is not shown.)

An erythro-diisotactic polymer is formed from a 100% reacted trans-polybutadiene and this polymer can be exemplified using the following Newman projection:

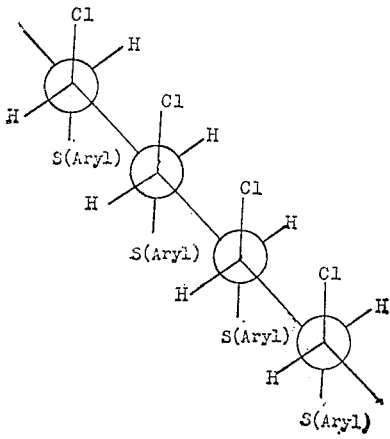

By infrared spectrophotometric analysis it has been determined in the case of cis-polybutadiene (92% cis) that the polymer which is unreacted with the arenesulfenyl halide retains the same cis:trans:vinyl proportions as the starting polymer so that there is a negligible degree of isomerization associated with the reaction. The I.V. (intrinsic viscosity) of the treated polymer remains about the same.

When an elastomeric polymer, for example cispolybutadiene, is to be reacted with an arenesulfenyl halide according to the present invention, the rubbery polymer may be dissolved in a suitable solvent such as benzene, carbon tetrachloride, xylene or a mixture of benzene and dioxane. Alternatively, the arenesulfenyl halide may be added directly to the rubbery polymer. Conventional antioxidants such as 2,2'-methylenebis(4-methyl-6-t-butylphenol) or phenyl-β-naphthylamine may be added to the polymer or polymer solution after the reaction.

The time and temperature of treatment of the elastomeric polymer with the arenesulfenyl halide is not critical and generally will be from 10 minutes to 25 hours, at temperatures from 5 to 75° C. The amount of arenesulfenyl halide used in the reaction is not critical. There appears to be no real advantage in using more than one mole of arenesulfenyl halide per double bond present in the starting polymer. Depending upon the desired extent of reaction, it appears that from .001 to 1 mole of arenesulfenyl halide may be used per double bond in the polymer.

Specific illustrative examples of the preparation of compounds of the present invention are shown in the examples below:

EXAMPLE 1

A solution of 86.4 g. of high cis-polybutadiene (corresponding to 1.60 moles of butadiene monomer) in 2228 ml. of carbon tetrachloride was made by dissolving the rubber while stirring under a nitrogen atmosphere. A solution of 58 g. (0.40 mole) of benzenesulfenyl chloride in 200 ml. of carbon tetrachloride was added with vigorous stirring, under nitrogen, during the course of thirty minutes. The reaction was exothermic, raising the temperature of the solution from 80° F. to 97° F. After another thirty minutes, a solution of 1 g. of 2,2'-methylenebis(4-methyl-6-t-butylphenol) in 50 ml. of carbon tetrachloride was stirred in thoroughly.

The resultant light yellow solution was evaporated to give 140 g. (97%) of solid, rubbery adduct which could be banded on a mill at 100–120° F. Comparison of the infrared spectra of the product and of the starting material indicated the same ratio of trans to vinyl peaks, showing no isomerization of unreacted double bonds during the addition. A thin sheet of the product had $n_D^{30}=1.6060$; the cis-polybutadiene starting material has $n_D^{30}=1.5210$.

The differential thermogram of the product in the range —120° to +60° C. showed a glass transistion at —57° C. as the only significant exotherm or endotherm.

*Analysis.*—Calcd. for $(C_4H_6)_{3n}(C_4H_6C_6H_5SCl)_n$ [containing one weight percent of the stabilizer $C_{23}H_{32}O_2$ based on total $C_4H_6$] (percent): C, 72.77; H, 8.05; Cl, 9.63; S, 8.83. Found (percent): C, 73.43; H, 8.00; Cl, 9.63; S, 9.91.

EXAMPLE 2

This example illustrates modification of cis-polybutadiene to a higher degree than that obtained in Example 1.

A solution of 10.8 g. of high cis-polybutadiene (corresponding to 0.20 mole of butadiene monomer) in 180 ml. of carbon tetrachloride was vigorously stirred under a nitrogen atmosphere and treated with a solution of 21.7 g. (0.15 mole) of benzenesulfenyl chloride in carbon tetrachloride. The red color of the sulfenyl chloride rapidly faded while an exothermic reaction occurred which caused the temperature to rise from 39° C. to 70° C. Evaporation of the solvent left a tough, light yellow rubbery product.

EXAMPLE 3

This example illustrates the sulfenyl chloride modification of cis-polybutadiene using benzene as a solvent.

A solution of 135 g. of cis-polybutadiene was prepared by stirring under nitrogen with 2800 ml. of benzene. A solution of 87 g. (0.24 equivalent) of benzenesulfenyl chloride in 50 ml. of benzene was added. After two hours a solution of 2 g. of 2,2'-methylenebis(4-methyl-6-t-butylphenol) in 20 ml. of benzene was added with stirring. The solvent was evaporated to leave a rubbery product similar to that made in Example 1.

EXAMPLE 4

This example illustrates the use of mixed benzene and dioxane as a reaction medium.

One hundred thirty-five grams of cis-polybutadiene was dissolved in 2800 ml. of benzene and 500 ml. of dioxane by stirring under a nitrogen atmosphere. A solution of 87 g. (0.24 equivalent) of benzenesulfenyl chloride in 500 ml. of benzene was added with stirring. After two hours a solution of 2 g. of 2,2'-methyleneis(4-methyl-6-t-butylphenol) in 20 ml. of benzene was added. Evaporation of the solvent gave a tough, light-yellow elastomer.

EXAMPLE 5

This example illustrates the use of benzene-dioxane mixed solvent as a medium for the complete saturation of cis-polybutadiene by addition of benzene-sulfenyl chloride.

To a solution of 122 g. of cis-polybutadiene in 2500 ml. of benzene and 1000 ml. of dioxane, under nitrogen, was added, with stirring, 326.5 g. (1.00 equivalent) of benzenesulfenyl chloride in 500 ml. of benzene. Upon completion of the reaction a solution of 2 g. of 2,2'-methylenebis(4 - methyl-6-t-butylphenol) was stirred in. Evaporation of the solvents left a residue of a tough, dense polymer than can be milled at 300–320° F.

EXAMPLE 6

This example illustrates the addition of benzene-sulfenyl chloride to a dry ethylene - propylene - dicyclopenadiene (molar ratio 110/39:2) terpolymer, of iodine number 10, on a rubber mill.

One hundred four grams of the terpolymer was milled at 125° F. for ten minutes during which time 3.5 g. (0.5 equiv.) of benzenesulfenyl chloride was added dropwise to the rolling mill bank. The red color of the sulfenyl chloride rapidly disappeared and a very light yellow elastomer was formed.

*Analysis.*—Calcd. for $$(C_2H_4)_{110}(C_3H_6)_{39}(C_{10}H_{12})_2C_6H_5SCl$$

(percent): Cl, 0.69. Found (percent): Cl, 0.63.

EXAMPLE 7

This example further illustrates the preparation of cis-polybutadiene adducts of benzenesulfenyl chloride. The solution technique described in Example 1 was employed.

| Example | A | B | C | D | E |
|---|---|---|---|---|---|
| Cis-polybutadiene, g | 200 | 200 | 100 | 81 | 135 |
| Carbon tetrachloride, ml | 3500 | 3500 | 2000 | 1600 | 2800 |
| Benzenesulfenyl chloride, g | 53.6 | 214 | 161 | 195.5 | 361 |
| Equivalent | 0.10 | 0.40 | 0.60 | 0.90 | 1.00 |
| Antioxidant,[1] g | 2.0 | 2.0 | 1.0 | 0.8 | 2.0 |
| Product, g | 249 | 416 | 261 | 276 | 492 |
| Yield, percent | 97.6 | 100 | 99.6 | 99.4 | 99.1 |
| Cl calcd., percent | 5.14 | 12.62 | | | 17.80 |
| Cl found, percent | 4.45 | 13.88 | | | 16.06 |
| S calcd., percent | 4.65 | 11.41 | | | 16.10 |
| S found, percent | 4.53 | 12.91 | | | 17.66 |
| Tg[2] of adduct, °C | −107 | −80 | −25 | 10 | 9 |

[1] 2,2′-methylenebis(4-methyl-6-t-butylphenol).
[2] Glass transition temperature.

The infrared spectrum of the product designated C in this example shows the same ratio of trans to vinyl absorbance as the starting cis-polybutadiene, indicating no isomerization of the unreacted double bonds.

EXAMPLE 8

This example illustrates that the sulfenyl chloride-modified elastomers are (a) vulcanizable by conventional curing agents, and (b) have improved resistance to swelling by hydrocarbons.

The following stocks were prepared on a rubber mill:

| | A | B | C | D | E |
|---|---|---|---|---|---|
| Cis-polybutadiene | 100 | | 100 | | |
| Cis-polybutadiene, 25% saturated with benzene-sulfenyl chloride | | 100 | | 100 | |
| Acrylonitrile-butadiene copolymer (30:70) | | | | | 100 |
| 2,4-tolylenebismaleimide | | | 1.2 | 1.2 | 1.2 |
| Benzothiazolyl disulfide | | | 2.0 | 2.0 | 2.0 |

Samples of each stock were pressed 30 minutes at 320° F. in molds having 2.0 x 2.0 x 0.070 inch cavities. One slab of each pressed stock was immersed separately in a 50:50 (by volume) mixture of toluene and isooctane (Fuel "C" of ASTM D471–64 test procedure) at room temperature.

The following observations were made after the indicated periods of immersion:

| Pressed Sample | A | B | C | D | E |
|---|---|---|---|---|---|
| Length of sample, in.: | | | | | |
| 48 hours | | | 4.0 | 2.9 | 2.4 |
| 30 days | (1) | (2) | 4.2 | 3.0 | 2.4 |

[1] Dissolved.
[2] Flowed to bottom of vessel.

These results show that both polybutadiene and the sulfenyl chloride-modified polybutadiene are vulcanizable by this bismaleimide-disulfide combination to form crosslinked, insoluble stocks. Further, the modified polybutadiene has oil resistance superior to unmodified polybutadiene.

EXAMPLE 9

This example illustrates (a) the use of a substituted benzenesulfenyl chloride and (b) the technique of carrying out the reaction on a rubber mill.

The following were mixed on a cool mill for 15 minutes. During the first 10 minutes the sulfenyl chloride was added dropwise across the rolling mill bank.

| | A | B | C | D |
|---|---|---|---|---|
| Cis-polybutadiene, g | 100 | 100 | 100 | 100 |
| p-Chlorobenzenesulfenyl chloride, g | 0 | 2 | 5 | 10 |

The red color of the p-chlorobenzenesulfenyl chloride rapidly disappeared during the additions. Products B and D were light yellow elastomers which showed much reduced cold flow in comparison with the blank A.

EXAMPLE 10

This example illustrates the addition of p-chlorobenzenesulfenyl chloride to an ethylene-propylene-dicyclopentadiene terpolymer in solution.

A solution of 150 g. of the terpolymer is iodine number 7.5 in 3000 ml. of carbon tetrachloride was treated with 7.92 g. of p-chlorobenzenesulfenyl chloride in 50 ml. of carbon tetrachloride. The solution was stirred sixteen hours, treated with 3 g. of 2,2′-methylenebis(4-methyl 6-t-butylphenol) in 50 ml. of carbon tetrachloride and then freed of solvent by evaporation to yield 161 g. (100%) of nearly colorless elastomeric product.

EXAMPLE 11

This example illustrates the preparation of an adduct of pentafluorobenzenesulfenyl chloride and cis-polybutadiene.

A solution of 3.62 g. of cis-polybutadiene (equivalent to 0.067 mole of butadiene) in 66.9 g. of heptane was treated at 25° C. with 6.8 g. (0.029 mole) of pentafluorobenzenesulfenyl chloride. There was a rapid disappearance of the red color of the sulfenyl chloride accompanied by a slight exotherm. The reaction mixture was allowed to stand for sixteen hours. The adduct was precipitated by pouring the mixture into methanol. The product was washed with methanol in a Waring Blendor and dried at 0.15 mm. to give 9.0 g. (86%) of a white rubbery product.

*Analysis.*—Calcd. for $[(C_4H_6)_{100}(C_6F_5SCl)_{43.3}]_n$ (percent): S, 8.90. Found (percent): 8.95, 8.82.

This product has improved oil resistance as determined from its decreased solubility in heptane relative to the starting polymer.

EXAMPLE 12

This example illustrates additions of pentafluorobenzenesulfenyl chloride to cis-polybutadiene at 25° C. using heptane as solvent for the rubber and carbon tetrachloride as solvent for the sulfenyl chloride.

| Example | A | B | C |
|---|---|---|---|
| Cis-polybutadiene, g | 2.64 | 2.00 | 2.14 |
| Heptane, g | 47.5 | 35.7 | 38.5 |
| Pentafluorobenzenesulfenyl chloride, g | 1.72 | 2.51 | 7.04 |
| Carbon tetrachloride, g | 117.4 | 118 | 224 |
| Polymeric adduct, g | 3.90 | 3.95 | 6.73 |
| Yield, percent | 90 | 88 | 73 |
| Theoretical percent saturation | 15 | 29 | 76 |
| Adduct Tg, °C | −80 | −38 | |
| S calcd., percent | | 7.62 | 10.46 |
| S found, percent | | 7.53 | 9.86 |

The modified polymers show improved oil resistance as compared with unmodified polymers.

EXAMPLE 13

This example illustrates the addition of pentachlorobenzenesulfenyl chloride to cis-polybutadiene.

| Example | A | B | C |
|---|---|---|---|
| Cis-polybutadiene, g | 21.4 | 31.9 | 21.7 |
| Heptane, g | 554.7 | 834.3 | 561 |
| Pentachlorobenzenesulfenyl chloride, g | 23.5 | 49.2 | 19.2 |
| Chloroform, g | 550 | 1890 | 1273 |
| Calculated percent saturation | 18.6 | 26.4 | 15.1 |
| Chlorine found in polymer, percent | | 39.6 | 28.5 |
| Polymer Tg, °C | | | −80° |

The adduct A was self-extinguishing after ignition.

EXAMPLE 14

This example shows the improved oil-resistance of various sulfenyl chloride adducts of cis-polybutadiene compared with unreacted cis-polybutadiene.

| Example | E | F | A | B | C | D |
|---|---|---|---|---|---|---|
| Sulfenyl chloride addend, RSCl, percent | 23 | 18 | 0 | 0 | 23 | 23 |
| R= | $C_6F_5$ | $C_6F_5$ | | | $p\text{-}CH_3C_6H_4$ | $p\text{-}ClC_6H_4$ |
| Curing recipe | B | A | A | B | B | B |
| Gehman $T_5$, °C | −14.5 | −15.5 | −38.5 | −39.8 | −32.8 | −44.8 |
| Volume-percent swell in isooctane:toluene 70:30 | 126 | 67 | 170 | 172 | 138 | 89 |

| Curing recipes | A | B |
|---|---|---|
| Adduct | 100 | 100 |
| High abrasion furnace black | 15 | 15 |
| Zinc oxide | 5 | 1 |
| Stearic acid | 1 | 1 |
| Mercaptobenzothiazolyl disulfide | 1.5 | 1.5 |
| Tetramethyl thiuram disulfide | 0.5 | 0.5 |
| Sulfur | 1 | 1 |
| Cured 30 minutes at 300° F. | | |

The values of the "volume-percent swell in isooctane:toluene 70:30" entries in columns C through F, which are adducts of the present invention, clearly show a decrease in the volume/swell ratio when compared with the values of the unmodified cis-polybutadiene polymers indicated in Columns A and B.

Having thus described our invention, what we claim and desire to protect by Letters Patent is:

1. A non-cross linked, water insensitive, thermally stable polymer having resistance to swelling by hydrocarbon solvents, comprising the reaction product of:
   (A) an elastomeric polymer selected from the group consisting of (a) cis-polybutadiene, (b) transpolybutadiene, (c) ethylene-propylene-dicyclopentadiene, (d) acrylonitrile-butadiene copolymer, (e) styrene-butadiene copolymer, and between about 0.001 and 1 mole per double bond in said elastomeric polymer of
   (B) an arenesulfenyl halide having the formula (aryl)—S—X, wherein (aryl) is an unsubstituted p group, or a phenyl group substituted with at least one radical selected from the class consisting of alkyl groups having 1 to 8 carbon atoms, nitro, halo or carboxyl groups, and X is bromine, chlorine or fluorine.

2. The polymer described in claim 1 in which the elastomeric polymer is cis-polybutadiene.

3. The polymer of claim 2 which has a stereo-regular configuration.

4. The polymer described in claim 1 in which the elastomeric polymer is an ethylene-propylene-dicyclopentadiene terpolymer.

5. The polymer described in claim 1 in which the elastomeric polymer is trans-polybutadiene.

6. The polymer of claim 5 which has a stereo-regular configuration.

7. The polymer described in claim 2 in which the arenesulfenyl halide is benzenesulfenyl chloride.

8. The polymer described in claim 2 in which the arenesulfenyl halide is perfluorobenzenesulfenyl chloride.

9. The polymer described in claim 2 in which the arenesulfenyl halide is p-chlorobenzenesulfenyl chloride.

References Cited

UNITED STATES PATENTS

| | | | |
|---|---|---|---|
| 3,105,818 | 10/1963 | Hewett | 252—47.5 |
| 3,310,536 | 3/1967 | Hewett | 260—79.5 |
| 3,311,663 | 3/1967 | Degeorges et al. | 260—608 |
| 3,320,214 | 5/1967 | Pedersen | 260—66 |
| 3,322,669 | 5/1967 | De Vries | 252—47 |
| 3,342,790 | 9/1967 | De Vries | 260—79.5 |

DONALD E. CZAJA, Primary Examiner

M. I. MARQUIS, Assistant Examiner

U.S. Cl. X.R.

260—79.5, 94.7, 80.78, 83.3, 85.1, 45.95, 41